United States Patent Office 3,445,487
Patented May 20, 1969

3,445,487
PROCESS FOR THE PREPARATION OF 3-OXO-4,6-DEHYDRO-19-NOR-STEROIDS
Gordon Hanley Phillipps, Greenford, Middlesex, England, assignor to Glaxo Laboratories Limited, Middlesex, England, a British company
No Drawing. Filed June 21, 1966, Ser. No. 559,084
Claims priority, application Great Britain, June 22, 1965, 23,390/65
Int. Cl. C07c *167/16, 169/10, 173/10*
U.S. Cl. 260—397.3                    15 Claims

ABSTRACT OF THE DISCLOSURE

This invention relates to the production of 3-oxo-4,6-dehydro-19-nor-steroids. The nor-steroids are produced by treating a 3-oxo-5(10), 7-dehydrosteroid with either an acid or a base. The preferred acids are hydrochloric, hydrobromic, perchloric, p-toluenesulphonic or phosphoric acid while the preferred bases are the alkali metal hydroxides, carbonates, bicarbonates and alkoxides.

---

3-oxo-4,6-dehydro-19-steroids are compounds of pharmacological interest due to their hormonal properties. They are also of value as intermediates in the preparation of other steroids of pharmacological interest. It is an object of the present invention to provide a process for their preparation.

According to the present invention we provide a process for the preparation of 3-oxo-4,6-dehydro-19-norsteroids in which a 3-oxo-5(10), 7-dehydro steroid is treated with an acid or a base.

On reduction with metal/ammonia or metal/amine reducing systems, e.g. lithium or sodium in liquid ammonia, the 3-oxo-4,6-dehydro-19-nor-steroids are converted to the corresponding 3-oxo - 5 - dehydro-19-nor-steroids which on conjugation under acidic or basic conditions give 3-keto-4-dehydro-19-nor-steroids, a type of compound possessing valuable hormonal activity. Thus, for example, 17β-hydroxy-oestra-4,6-dien-3-one can be converted in this way to 19-nor-testosterone, a valuable compound which is not readily prepared by other mehods.

The acid is preferably a strong acid, for example, hydrochloric, hydrobromic, perchloric, p-toluene sulphonic or phosphoric acid. The base may, for example, be an alkali metal hydroxide, carbonate, bicarbonate or alkoxide. An inert solvent is preferably present, preferably an aqueous organic solvent for example an alkanol such as methanol, ethanol etc. or a cyclic ester such as tetrahydrofuran or dioxan.

The 3-oxo-5,(10),7-dehydrosteroid starting compound may conveniently be prepared from a 2,5(10),7-dehydrosteroid 3-ether or a 5(10),7-dehydro-steroid 3-ketal by treatment with a weak acid, for example with a lower aliphatic acid such as acetic or propionic acid, preferably in a water-miscible organic solvent such as alkanol e.g. methanol or ethanol. Such 2,5(10),7-dehydrosteroid 3-ethers and 5(10),7-dehydrosteroid-3-ketals are described in our copending U.S. application No. 559,074, filed June 21, 1966.

We have further found that the 2,5(10),7-dehydrosteroid 3-ether and 5(10),7-dehydrosteroid-3-ketals can be converted to the 3-oxo-5(10),7-dehydrosteroid by treatment with a strong acid, such as one of those described above whereupon the rearrangement according to the invention takes place in situ to yield the desired 3-oxo-4,6-dehydro-19-nor-steroid. The strong acid may be one of those specified for the rearrangement reaction.

The steroids used as starting material may carry varying substituents in the C and D rings and, for example, may possess a 17-oxo group, a protected 17-oxo group such as a ketal group, or a 17-hydroxy or 17-acyloxy group or a 17-acyl, 17-acetoxyacetyl, 17-aliphatic or 17-araliphatic group, e.g. a methyl, ethyl, ethylnyl, chloroethynyl group, in the presence or absence of a 17-hydroxy or 17-acyloxy group.

The 17-acyloxy group may, for example, be a lower aliphatic acyloxy group having 1–5 carbon atoms e.g. a propionyloxy or acetoxy group.

Substituents which are susceptible to acid hydrolysis may be attacked during the reaction but may nevertheless yield useful end products; thus, for example, a 17-ketal group may be converted to a 17-oxo group.

The oxo-4,6-dehydro-19-nor-steroids will normally be predominantly the 8β,9α,10β isomers but if the reaction according to the invention is effected under basic conditions a proportion of the corresponding 8α,9α,10α isomer will be formed. The 3-oxo-4,6-dehydro-8α,9α,10α-19-nor-steroids are new compounds and constitute a further feature of the invention. They may be converted into the corresponding 8β,9α,10β-isomers by treatment with acid, for example with a mineral acid such as hydrochloric acid e.g. in a solvent such as methanol.

In order that the invention may be well understood, we give the following examples by way of illustration only; all temperatures are in ° C.:

Example 1.—17β-hydroxyoestra-4,6-dien-3-one

3.-methoxyoestra-3,5(10),7-trien-17β-ol (67 mg.) in boiling methanol (3 ml.) was treated with aqueous 5.5 N-hydrochloric acid (0.75 ml.). The reaction mixture was boiled under reflux for 2 hrs., concentrated in vacuo, and diluted with water. The oily product was extracted into ether, and the extract was washed with water, dried (MgSO$_4$), and concentrated to dryness in vacuo. The residual froth (58 mg.) crystallised from ether-petroleum ether to give 17β-hydroxyoestra-4,6-dien-3-one (25 mg.), M.P. 176–180°, [α]$_D$+18° (c., 1.0 in CHCl$_3$), λ max. 282 mμ (ε 22,400).

Example 2.—Preparation of 17β-hydroxyoestra-4,6-dien-3-one from 17β-hydroxyoestra-5(10),7-diene - 3 - one with sodium hydrogen carbonate in methanol 17β-hydroxyoestra-5(10),7-dien-3-one (100 mg.) in methanol (25 ml.) was treated with sodium hydrogen carbonate (204 mg.) and the suspension was boiled under reflux for 6 hr. and then allowed to stand at 0° for 2.5 days. The reaction was poured into acetic acid (3.5 ml.) and water (31.5 ml.) and more water was added. The product was extracted into ethyl acetate and purified by crystallisation from ether and chromatography to give the 4,6-dien-3-one (16 mg.), M.P. 162–167°, λ max. (in EtOH) 283 mμ (ε 22,300).

Example 3.—Oestra-4,6-diene-3,17-dione from 3 methoxyoestra-2,5(10),7-trien-17-one 17-ethylene ketal A mixture of 3-methoxyoestra-2,5(10),7-trien-17-one 17-ethylene ketal (5.0 g.), methanol (250 ml.), 30% aqueous hydrochloric acid (37 ml.) and water (37 ml.) was boiled in an atmosphere of nitrogen for 5 hr. Sodium hydrogen carbonate solution was added to neutrality and the methanol was distilled off in vacuo. The steroid was filtered off and crystallised from ethyl acetate/petroleum ether (B.P. 40–60°) to give oestra-4,6-diene-3,17-dione (2.15 g.) having M.P. 186–190° [α]$_D$+61°, λ$_{max.}$ (in EtOH) 281 mμ (ε 27,200). [Heusler et al., (Experientia 1962, 18, 464) found M.P. 181–182°, [α]$_D$+58°].

Example 4.—The preparation of 17β-hydroxyoestra-4,6-dien-3-one from 3-cyclopentyloxyoestra-2,5(10),7-trien-17β-ol A solution of 3-cyclopentyloxyoestra-2,5(10),7-trien-17β-ol (0.459 g.) in methanol (12 ml.) containing water (1.9 ml.) and 30% aqueous hydrochloric acid (1.9 ml.) was boiled under reflux in an atmosphere of nitrogen for 4 hr. Sodium hydrogen carbonate solution was added to neutrality and the methanol was evaporated off under reduced pressure. The steroid was extracted with ether and crystallised from acetone/hexane to give 17β-hydroxyoestra-4,6-dien-3-one (0.17 g.) having M.P. 178–179°, $[\alpha]_D+11.5°$. (Lit: M.P. 185–186°, $[\alpha]_D+11°$).

Example 5.—Oestra-4,6-diene-3,17-dione from 3-methoxyoestra-2,5(10),7-trien-17-one A mixture of 3-methoxyoestra-2,5(10),7-trien-17-one (0.247 g.), methanol (7 ml.), water (1 ml.), and 30% aqueous hydrochloric acid (1 ml.) was boiled under reflux in an atmosphere of nitrogen for 4 hr. Aqueous sodium hydrogen carbonate was added and the methanol was evaporated under reduced pressure. The steroid was extracted into ether and the extract was washed, dried, and evaporated. The residue was crystallised from ethyl acetate to yield oestra-4,6-diene-3,17-dione (72 mg.), M.P. 178–182°, $[\alpha]_D+75.3°$ (in dioxan), $\lambda_{max.}$ (in EtOH) 281 m$\mu$ ($\epsilon$ 25,500).

Example 6.—Oestra-4,6-diene-3,17-dione from oestra-5(10),7-diene-3,17-dione

A mixture of oestra-5(10),7-diene-3,17-dione (0.159 g.), methanol (4 ml.), water (0.6 ml.) and 30% aqueous hydrochloric acid (0.6 ml.) was boiled under reflux in an atmosphere of nitrogen for 4 hr. Aqueous sodium hydrogen carbonate was added and the methanol was evaporated under reduced pressure. The steroid was extracted into ether and the extracts were washed, dried, and evaporated. The residue was crystallised from ethyl acetate to yield oestra-4,6-diene-3,17-dione (74.5 mg.), M.P. 177–181°, $[\alpha]_D+74.7°$ (in dioxan), $\lambda_{max.}$ (in EtOH) 282 m$\mu$ ($\epsilon$ 26,200).

Example 7.—(a) 17β-hydroxyoestra-4,6-dien-3-one and 17β-hydroxy-8α,10α-oestra-4,6-dien-3-one from 17β-hydroxyoestra-5(10),7-dien-3-one 17β-hydroxyoestra-5(10),7-dien-3-one (460 mg.) was dissolved in methanol (100 ml.) and sodium hydrogen carbonate (1 g.) dissolved in water (10 ml.) was added. The solution was boiled under reflux in an atmosphere of nitrogen for 5½ hr. The reaction mixture was poured into water and the product was extracted into ether. Removal of the ether in vacuo gave a yellow gum (389 mg.). Crystallisation from ethyl acetate gave 17β-hydroxy-8α,10α-oestra-4,6-dien-3-one (67 mg.), M.P. 226–228°, $[\alpha]_D+94°$ (c. 0.49 in CHCl$_3$), $\lambda_{max.}$ (in TtOH) 282 m$\mu$, $$E^{1\%}_{1\,cm.}\ 906$$

The mother liquors were evaporated and chromatographed on a thin layer of silica, using ethyl acetate/benzene (1:1) as solvent. The main component (170 mg.) was extracted with ethyl acetate and recrystallised from ethyl acetate to give 17β-hydroxy-oestra-4,6-dien-3-one, M.P. 182–184°, $[\alpha]_D+13°$ (CHCl$_3$).

(b) 17β-hydroxyoestra-4,6-dien-3-one from 17β-hydroxy-8α,10α-oestra-4,6-dien-3-one 17β-hydroxy-8α,10α-oestra-4,6-dien-3-one (50 mg) was dissolved in methanol (5 ml.) and 5.5 N-hydrochloric acid (1.25 ml.) was added. The solution was boiled under reflux in an atmosphere of nitrogen for 5 hr. and poured into sodium hydrogen carbonate solution. The product was isolated with ether to give 17β-hydroxyoestra-4,6-dien-3-one (45 mg.), M.P. 174–179°, $[\alpha]_D+20°$ (c. 0.5 in CHCl$_3$), $\lambda_{max.}$ (in EtOH) 282 m$\mu$, with infrared and proton magnetic resonance spectra resembling those of an authentic sample.

(c) 19-nortestosterone from 17β-hydroxyoestra-4,6-dien-3-one

17β-hydroxyoestra-4,6-dien-3-one (200 mg.) in tetrahydrofuran (5 ml.) was added to a solution of lithium (ca. 20 mg.) in ammonia (20 ml.). The solution was stirred for 15 minutes; potassium hydroxide (0.5 g.) in methanol (5 ml.) was added slowly and the ammonia was evaporated. The residue was poured into water and the product was extracted into chloroform in the usual way to give a gum; this was chromatographed on a thin layer of silica, using ethyl acetate/chloroform (1:1) as solvent, and eluted with ethyl acetate. Crystallisation of the product (135 mg.) from ether gave 19-nortestosterone, M.P. 116–118°, $[\alpha]_D+56°$ (c. 0.5 in CHCl$_3$), $\lambda_{max.}$ (in EtOH) 240 m$\mu$, $$E^{1\%}_{1\,cm.}\ 605$$

Example 8.—17β-hydroxyoestra-4,6-dien-3-one from 17β-hydroxyoestra-5(10),7-dien-3-one 3-ethylene ketal A boiling solution of 17β-hydroxyoestra-5(10),7-dien-3-one 3-ethylene ketal (200 mg.) in methanol (20 ml.) under nitrogen was treated with 5.5 N-thydrochloric acid (5 ml.) for 5 hr. The solution was poured into aqueous sodium hydrogen carbonate and the product was isolated with ether. Crystallisation from acetone/hexane gave 17β-hydroxyoestra-4,6-dien-3-one (72 mg.), M.P. 182–184°, $[\alpha]_D+14°$ (c. 0.5 in CHCl$_3$).

We claim:
1. A process for the preparation of a 3-oxo-4,6-dehydro-19-nor-steroid which comprises treating a 3-oxo-5(10),7-dehydro-steroid with a reagent selected from the group consisting of a strong acid and a base.

2. A process according to claim 1 wherein the reagent is a strong acid and said acid is selected from the group consisting of hydrochloric, hydrobromic, perchloric, p-toluenesulphonic and phosphoric acid.

3. A process according to claim 1 wherein the reagent is a base and said base is selected from the group consisting of an alkali metal hydroxide, a carbonate, a bicarbonate and an alkoxide.

4. A process according to claim 1 wherein the treatment with said reagent is effected in a solution comprising a solvent selected from the group consisting of an alkanol and a cyclic ether.

5. A process according to claim 4 wherein the solvent is an alkanol and said alkanol is selected from the group consisting of methanol and ethanol.

6. A process according to claim 4 wherein the solvent is a cyclic ether and said ether is selected from the group consisting of tetrahydrofuran and dioxan.

7. A process according to claim 1 wherein said 3-oxo-5(10),7-dehydro-steroid is treated with a base and an 8α,9α,10α-19-nor-steroid is thereby produced, and the nor steroid produced is converted to the corresponding 8α,9α,10β-19-nor-steroid by treatment with acid.

8. A process according to claim 1 wherein the 3-oxo-5(10),7-dehydro-steroid is prepared by reacting a weak acid with a compound selected from the group consisting of 2,5(10),7-dehydro-steroid-3-ether and a 5(10),7-dehydro-steroid 3-ketal.

9. A process according to claim 8 wherein the weak acid is a lower aliphatic acid.

10. A process according to claim 9 wherein said lower aliphatic acid is selected from the group consisting of acetic acid and propionic acid.

11. A process according to claim 8 wherein the weak acid is reacted with said compound in a water-miscible solvent.

12. A process according to claim 1 wherein the 3-oxo-5(10),7-dehydro-steroid possesses at its 17-position a member selected from the group consisting of 17-oxo; 17-protected oxo; 17-hydroxy; 17-acyloxy; 17-acyl; 17- acyl, 17-hydroxy; 17-acyl, 17-acyloxy; 17-acetoxyacetyl; 17-acetoxyacetyl, 17-hydroxy; 17-acetoxyacetyl, 17-acyloxy; 17-aliphatic; 17-aliphatic, 17-hydroxy; 17-aliphatic, 17-acyloxy; 17-araliphatic; 17-araliphatic, 17-hydroxy; and 17-araliphatic, 17-acyloxy.

13. A process according to claim 12 wherein the group at the 17-position is selected from the group consisting of methyl, ethyl, ethynyl and chloroethynyl.

14. A process for the preparation of a 3-oxo-4,6-dehydro-19-nor-steroid which comprises reacting a strong acid with a compound selected from the group consisting of a 2,5(10),7-dehydro-steroid 3-ether and a 5(10),7-dehydrosteroid 3-ketal until a 3-oxo-5(10),7-dehydrosteroid is produced and continuing the reaction until the said dehydrosteroid produced is converted to the desired 3-oxo-4,6-dehydro-19-nor-steroid.

15. A process according to claim 14 wherein the strong acid is selected from the group consisting of hydrochloric acid, hydrobromic acid, perchloric acid, p-toluenesulphonic acid and phosphoric acid.

References Cited

UNITED STATES PATENTS

| | | |
|---|---|---|
| 3,340,278 | 9/1967 | Kruger. |
| 3,376,295 | 4/1968 | Seddall. |
| 3,230,217 | 1/1966 | Bowers et al. _____ 260—239.55 |
| 3,262,950 | 7/1966 | Kincl _____ 260—397.47 |

ELBERT L. ROBERTS, *Primary Examiner.*

U.S. Cl. X.R.

260—239.55, 397.4, 397.47

PO-1050
(5/69)

UNITED STATES PATENT OFFICE
CERTIFICATE OF CORRECTION

Patent No. 3,445,487          Dated    May 20, 1969

Inventor(s)  Gordon Hanley Phillipps

It is certified that error appears in the above-identified patent and that said Letters Patent are hereby corrected as shown below:

Column 1, line 9

"23,390/65" should read "26,390/65"

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents